Nov. 3, 1942.                W. WARE                2,300,444
                              ROLLER
                        Filed Aug. 3, 1940
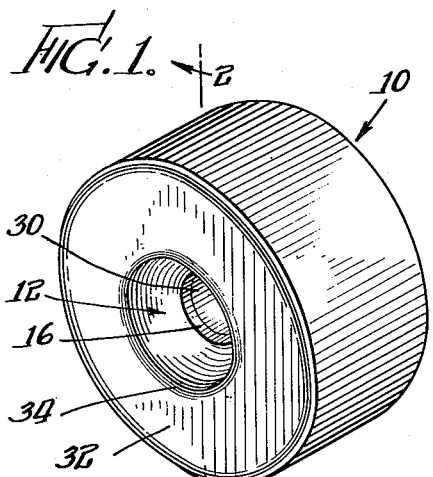
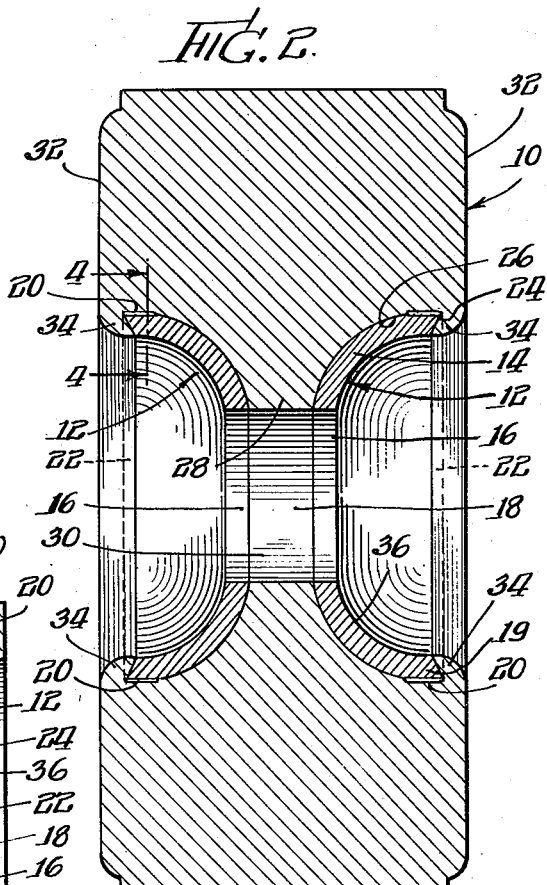
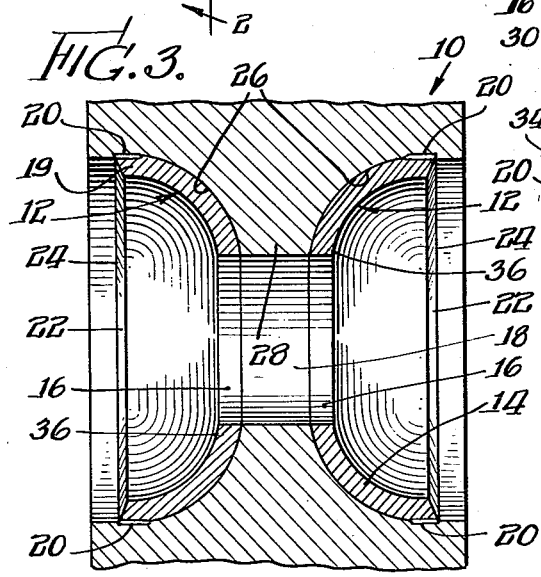
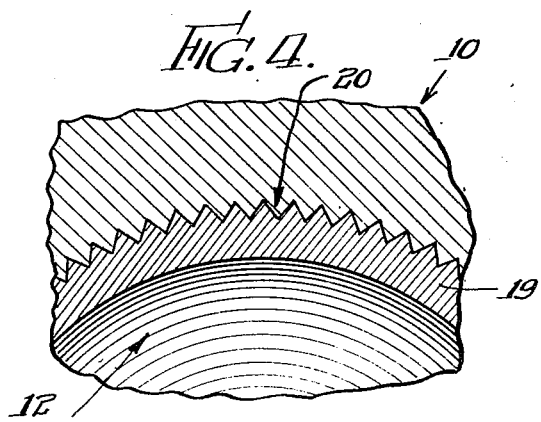
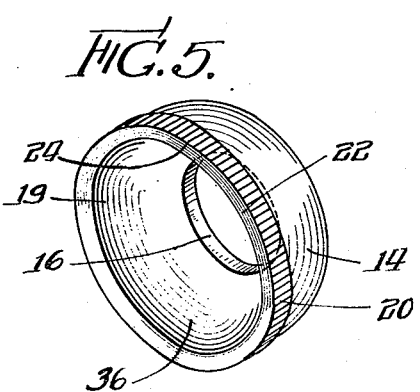
INVENTOR.
Walter Ware
BY Cox Moore & Olson
ATTORNEYS Patented Nov. 3, 1942

2,300,444

UNITED STATES PATENT OFFICE 2,300,444

ROLLER

Walter Ware, Chicago, Ill., assignor to Chicago Roller Skate Company, Chicago, Ill., a corporation of Illinois Application August 3, 1940, Serial No. 350,912

5 Claims. (Cl. 301—5.3)

The present invention relates to a wheel or roller construction and is more particularly concerned with a roller for use on roller skates, casters, and the like.

The present invention contemplates particularly the provision of a molded composition or plastic roller deriving its form and shape as the result of molding under heat and/or pressure. Rollers of the instant class are adaptable to usage on floors susceptible to wear by harder metallic roller tread surfaces. Molding composition known and in use provide the preferred combination of toughness, softness and wear resistance for use in conjunction with wooden floors, for example. Difficulty has been hitherto experienced in permanently associating the necessary bushing construction including bearing race portions which, subjected to concentrated stresses, tend to loosen in service. It is an object of the present invention to provide an improved roller having compact bushing portions positively held within the body of the roller by molding and restrained against loosening and separation in all directions.

A further object of the present invention contemplates the utilization in a combination such as the above of concave bearing race bushing portions molded or inlaid within the body of the roller and presenting substantially only the bearing surface outwardly of the molded unit. To this end, the present invention yet more specifically comprehends the provision of concave bushings as above having annularly disposed axially arcuate wall sections of generally uniform thickness and free from lateral flanges to receive the molded material about the marginal extremities thereof.

A further object of the invention is to provide an improved roller wherein the central bushing portion occupies a relatively small portion of the assembly and is centrally offset from the margins, the relatively large uninterrupted mass of the molded body material contributing materially to the strength and permanence thereof and spacing the metallic portions of the bushing in contact with surrounding objects.

Yet other and further objects will be apparent from a consideration of the following specification and drawing, wherein:

Figure 1 is a perspective view of a roller constructed in accordance with the principles of the present invention;

Figure 2 is a sectional view taken centrally through Figure 1 on the line 2—2 thereof;

Figure 3 is a detail sectional view taken on the same plane as Figure 2, but illustrating the relationship of the body and bushing portions of the roller at an intermediate step in their assembly and prior to final molding;

Figure 4 is a detailed sectional view taken on the line 4—4 of Figure 2;

Figure 5 is a perspective view of one of the bushing members removed from the roller.

Referring now more in detail to the figures of the drawing, wherein I have disclosed one structural embodiment of the principles of the present invention, Figures 1 and 2 disclose a construction comprising a body 10 embracing a central bushing means comprising a pair of concave shells or bushings 12. It will be understood that the body or tire portion 10 may be composed of any suitable molded, plastic, or composition material and adapted to be shaped to the form illustrated by the application of pressure in a complementary mold or die. Since the specific composition of the molded product forms no part of the present invention, it is thought sufficient to state that any conventional material may be herein utilized.

The bushing or bearing means 12, as shown more in detail in Figures 2, 3 and 5, are of hemispherical or cup shape providing an annularly disposed wall section arcuately disposed outwardly and axially as at 14. It should be particularly noted that the wall section 14 is of substantially uniform thickness and terminates inwardly at a marginal wall or face 16 disposed axially of the roller. Thus, the inner margin of the bushing defines a central aperture 18 through the entire assembly. The arcuate outwardly and axially extending wall section terminates at its opposite axial extremity in an annular wall section 19 which is generally axially disposed with respect to the remainder of the roller and substantially cylindrical in configuration, and is provided on its outer surface with circumferentially disposed serrations 20. The serrations 20 comprise radially outwardly extending ridges disposed about the periphery of the generally cylindrical wall section 19 and arranged in parallelism to the bushing axis. As clearly shown in the drawings, the serrations comprise outwardly projecting sharpened ribs or ridges separated by alternate V-grooves.

From the foregoing it will be evident that the serrated or roughened portions of the bushing periphery are provided to facilitate interlocking engagement with the body portion for materially enhancing the permanence of the roller.

It is particularly important to note that the bushing terminates adjacent the lateral face of the roller in a marginal portion 22 completely free from any lateral flanges or substantial projections. In short, the bushing terminates at this extremity in a marginal face of no greater extent than the normal sectional thickness of the bushing material. Yet more specifically, the extreme marginal edge 22 of the bushing is beveled radially inwardly as clearly shown in Figures 2 and 3, whereby the outer edge of the bevel 24 is relatively axially disposed and, as will be seen hereinafter, provides an inclined surface of limited radial extent but nevertheless inclined inwardly toward the axis of the roller as well as toward the midplane of the roller for engagement with the body portion.

Attention is particularly directed to this interfitting engagement as shown in Figure 2. It will be seen that the arcuate portions 14 of the bushings have their outer surfaces received against complementary faces 26 of the body portion. The body 10 has a central inwardly extending part 28 projecting between the bushings and terminating in an annular face 30 in alignment with the bushing faces 16. The side walls 32, however, of the molded body portion are disposed relatively axially outwardly beyond the margins of the bushing so that the material of the body portion may be molded completely about the marginal face 22 as indicated at 34. In other words, each bushing is axially encompassed, embraced or inlaid within the body by this axial overlapping of the molded material about the outer margin of the bushing. Attention is further directed to the fact that when so assembled the serrations 20 receive the molded material in complementary association to further resist relative straining of the parts.

I have particularly illustrated in Figure 3 one method for associating the parts of the roller. It will be seen that, in accordance with this figure, the body portion 10 has been given a preliminary shaping suitable to receive the pair of bushing members 12 which have been located centrally as shown. It will be appreciated from the foregoing that with the body portion in a relatively plastic condition, the bushing cups 12 are freely insertable within complementary laterally facing bores or recesses, or within roughly formed bores under sufficient lateral pressure to cause the plastic material to complementarily conform. In this condition, it will be noted that the moldable body engages the outer arcuate surface of the bushing and the serrated portions. The present invention contemplates the additional final molding of the assembly shown in Figure 3 in an appropriate die or mold to the final form shown in Figure 2, during which step it will be evident that the body material is positively compressed and forced to flow inwardly about the marginal faces 22 of the bushings. The invention contemplates preferably a molding step which leaves the unit in a dense, compacted or "cured" condition capable of positively restricting and locating the bushing portions as shown.

It should be particularly noted that the present invention provides a roller in which the bushing portion is substantially completely inset within a molded body so that the outer marginal surfaces are generally completely enclosed with the exception of the bearing race surface, which must be exposed to the action of suitable cooperating bearing means and which has been represented by the reference numeral 36 in the drawing. Accordingly, the hemispherical outer surfaces of the bushing cups are complementarily received within the body and loosening in an axially outward direction is positively prevented by the overlapping molded abutment sections 34 which restrain all relative movement in an axial direction. Relative rotational loosening is positively resisted by the interengaging serrations 20 providing interlocking surfaces disposed transversely to the plane of the annular portion 19. It is further particularly important to note that by virtue of the substantially axial disposition of the serrations 20, relative straining of the parts in the curved hemispherical plane of the section 14 is additionally resisted. In other words, the combination of generally cylindrical and hemispherical portions in coaxial disposition materially resists relative arcuate shifting in a direction transverse to the axis. It will be obvious from the foregoing that this latter factor is important in resisting relative canting tendencies of the bushings which would otherwise tend to rupture or break the marginal wall abutment 34. Accordingly, therefore, this marginal abutment functions solely to resist bodily axial loosening of the adjacent bushing and is relieved of the necessity for additionally resisting the foregoing torsional or canting displacement of the bushing.

It has been found that the present invention provides a roller of improved permanence and serviceability in comparison with those prior constructions of which I am aware and wherein loosening and separation of the parts frequently occur. It is further of significance that the prior constructions to which I refer have been characterized by projecting or flange portions extending into the body of the roller, materially interfering with the sectional continuity and rigidity while presenting outwardly undesirable metallic faces. I have discovered in accordance with the present invention that such constructions, in weakening the embracing body portion and presenting broad molded surfaces, actually lessen the permanence of the structure. In contradistinction, the present invention provides a simple, compact bushing construction molded substantially completely within the body. It is furthermore important to note that the present invention provides a molded article of improved appearance having molded surfaces substantially throughout its outer portions merging in alignment with the metallic bearing surfaces.

Obviously, the invention is not limited to the specific structural arrangement disclosed herein, but is capable of other modifications and changes without departing from the spirit and scope of the present invention.

The invention is hereby claimed as follows:

1. A roller comprising a bushing having an annular wall portion defined by an outer surface curving radially and axially outwardly from an inner margin of the bushing and an inner surface disposed in general parallelism to said outer surface, said bushing terminating at its outer margin in a radially extending face extending between said surfaces, and a molded body portion coaxially receiving said bushing, said body portion having molded engagement with said outer curved surface and having an integral abutment portion formed in molded engagement with said radially extending face and operative to axially retain said bushing within the body, said radially extending face being inclined inwardly toward the mid-portion of the roller to accommodate a substantial thickness of molded material between the plane of the side surface of said molded body portion and the said inclined face.

2. A roller comprising a bushing moldedly received within the molded body portion of the roller, said bushing being defined by a generally axially extending wall adjacent the side of the roller, said wall having inner and outer surfaces and terminating in the vicinity of the side of said roller in a face extending radially between said inner and outer surfaces, said radially extending face being inclined inwardly in a direction toward the mid-plane of the roller to provide a body engaging face for cooperation with the molded body portion and said molded body having a portion of substantial thickness molded about said inclined face to retain the bushing in permanent interengagement.

3. A roller comprising a bushing received within a molded body portion of the roller, said bushing being defined by a generally axially extending wall adjacent the side of the roller, said wall having an outer surface in molded engagement with said molded body portion, said surface terminating in the vicinity of the side of said roller in a margin defined by a face extending radially inwardly and intersecting said outer surface, said radially extending face being inclined inwardly in a direction toward the midplane of the roller, and said molded body having a portion molded about said inwardly inclined face to retain the bushing in permanent interengagement and being of substantial thickness to cooperate with the inclined face in holding the bushing in assembled relation.

4. In combination, a bushing construction for a molded type roller skate wheel comprising an annular cup-shaped member having inner and outer generally hemispherical surfaces and terminating at one axial extremity in a face extending radially between said inner and outer surfaces and adapted to be located in the roller at a point in the vicinity of a side of said roller, said radially extending face being inclined inwardly in a direction toward the midplane of the roller and being adapted to receive a portion of said molded body thereabout to retain the bushing in permanent interengagement, and a molded body portion having a side portion arranged in a plane outwardly beyond said inclined surface and molded into contact with said surface to provide a retaining section of substantial thickness.

5. In combination, a bushing construction for a molded type roller skate wheel comprising a bushing adapted to be moldedly received within the molded body portion of the roller, said bushing being defined by a generally axially extending wall adjacent the side of the roller, said wall having an outer surface adapted to receive the molded body portion in contact therewith, said wall terminating at one axial margin in a face extending radially inwardly therefrom, said radially extending face being inclined inwardly in a direction toward the opposite axial extremity of said bushing, said edge being adapted to receive said molded body thereabout to retain the bushing in permanent engagement, and a molded body portion formed about said bushing and having a portion extending outwardly about said inclined surface and molded into contact with said surface to provide a retaining section.

WALTER WARE.